D. F. BRODERICK.
ENDLESS CARRIER.
APPLICATION FILED AUG. 2, 1906.
No. 898,550.
Patented Sept. 15, 1908.
3 SHEETS—SHEET 2.
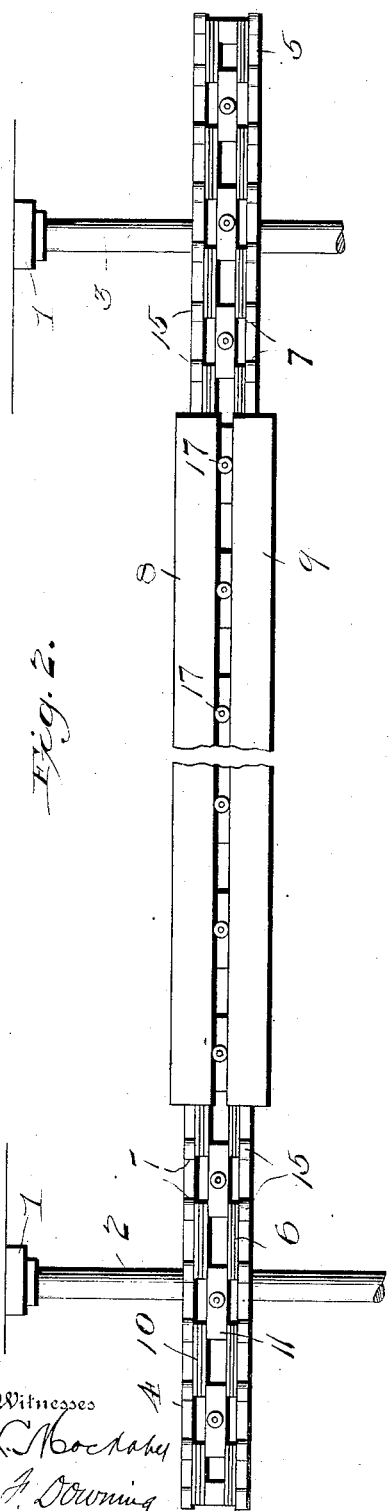
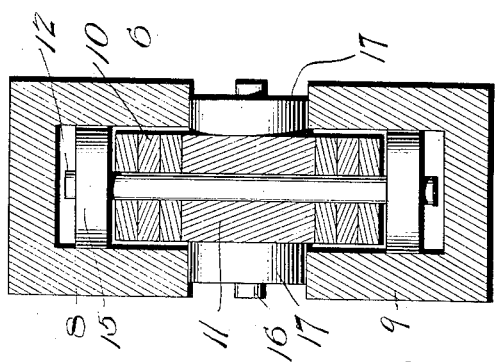
Witnesses
T. L. Mockabu
G. F. Downing
Inventor
D. F. Broderick
By H. A. Seymour
Attorney D. F. BRODERICK.
ENDLESS CARRIER.
APPLICATION FILED AUG. 2, 1906.
898,550.
Patented Sept. 15, 1908.
3 SHEETS—SHEET 3.
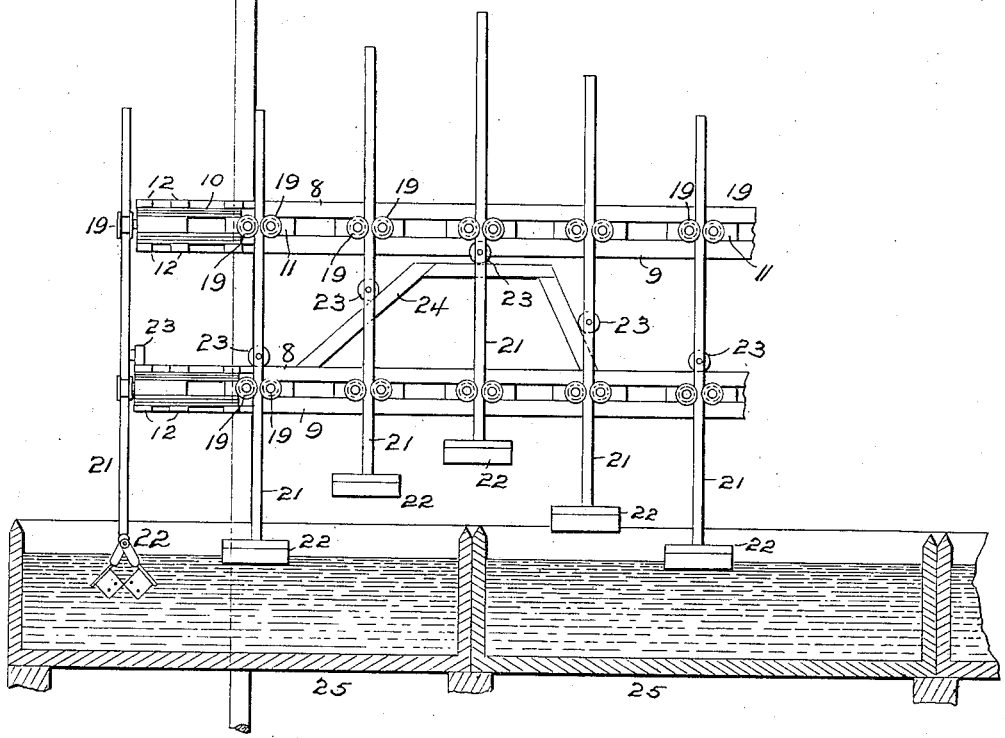
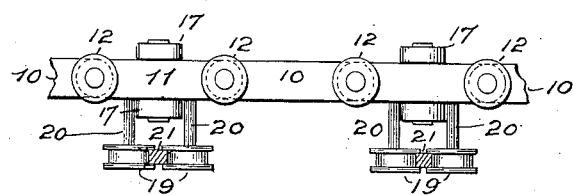
WITNESSES
INVENTOR

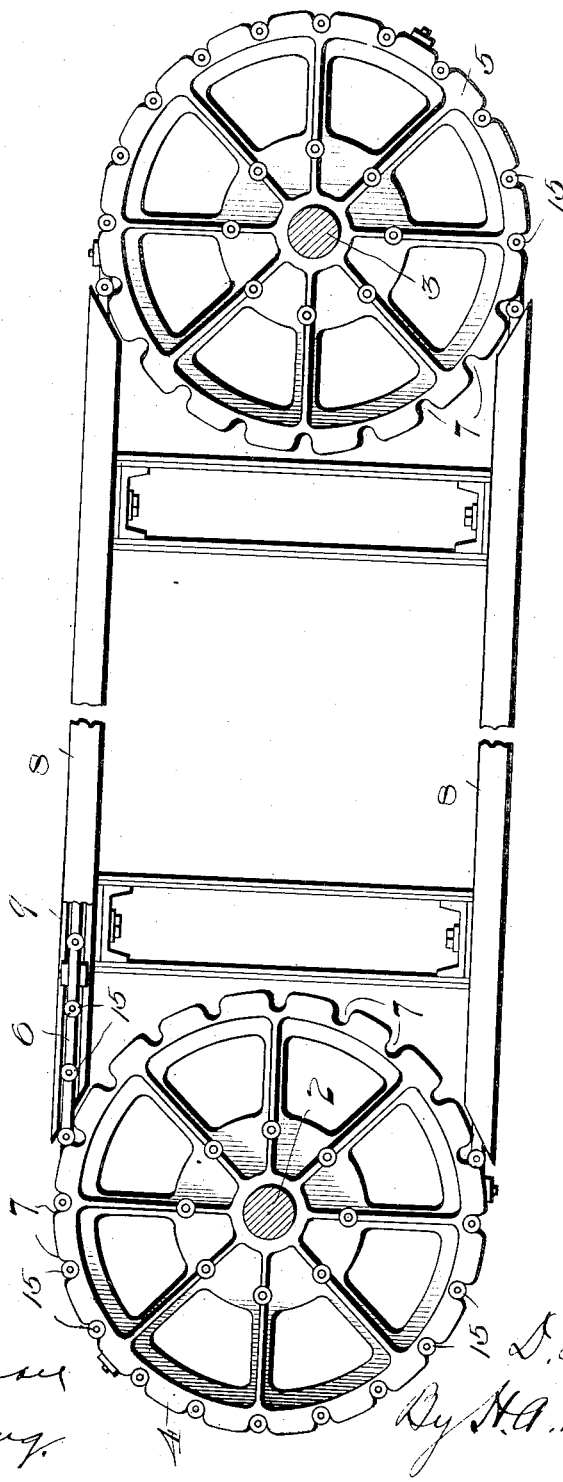

UNITED STATES PATENT OFFICE.

DAVID FELIX BRODERICK, OF NEW BRITAIN, CONNECTICUT, ASSIGNOR OF ONE-HALF TO LEWIS SPERRY, OF SOUTH WINDSOR, CONNECTICUT.

ENDLESS CARRIER.

No. 898,550.  Specification of Letters Patent.  Patented Sept. 15, 1908.

Application filed August 2, 1906. Serial No. 328,969.

*To all whom it may concern:*

Be it known that I, DAVID FELIX BRODERICK, a resident of New Britain, in the county of Hartford and State of Connecticut, have invented certain new and useful Improvements in Endless Carriers; and I do hereby declare the following to be a full, clear, and exact description of the invention, such as will enable others skilled in the art to which it appertains to make and use the same.

My invention relates to improvements in endless carriers, the object of the invention being to so construct the carrier that it shall be strong, durable and easy running, and so that the chain of the carrier will be maintained in a correct straight position between the sprocket wheels.

A further object is to so construct the apparatus that undue vertical and horizontal play of the carrier will be prevented.

With these objects in view, the invention consists in certain novel features of construction and combinations and arrangements of parts as hereinafter set forth and pointed out in the claims.

In the accompanying drawings; Figure 1 is a plan view of the carrier; Fig. 2 is a side view; Fig. 3 is a sectional view; and Fig. 4 is a view of a portion of the carrier chain. Figs. 5 and 6 are views illustrating an application of my invention.

1 represents suitable framework in which shafts 2—3 are mounted, and on these shafts, sprocket wheels 4—5 are secured, for the accommodation of the chain 6 of the carrier. Each sprocket wheel is made with parallel flanges between which the chain passes and these flanges have notches 7 in their peripheral portions.

Channeled guides 8—9 are arranged so as to face each other somewhat spaced apart and secured to the framework as clearly shown in Fig. 3. Through these coöperating channeled guides, the carrier chain passes. The carrier chain comprises links 10 and 11, pivotally connected together by means of pins 12. Each link 10 comprises two laminated members 13—14 spaced apart for the reception of the link 11 between them, said link 11 consisting of a solid bar. Each hinge pin 12 projects beyond the faces of the members of the link 10 and is provided on its ends with rollers 15 which run between the parallel walls of the channeled guides 8—9 and thus prevent lateral displacement of the carrier. These rollers 15 also mesh with the notches 7 of the sprocket wheels to propel the carrier. Each link 11 is provided on opposite faces with pintles 16 on which rollers 17 are mounted, said rollers being disposed between the opposing edges of the channeled guides and serving to prevent undue vertical vibration or displacement of the carrier.

From the above construction and arrangement of parts it will be seen that the carrier will be accurately guided in its movements and kept perfectly straight between the sprocket wheels, and also that undue lateral or vertical vibration or displacement will be effectually prevented.

The devices to be conveyed by the carrier are supported by the links 11. In Figs. 5 and 6 of the drawing, I have illustrated the application of my improvements to plating apparatus. When thus used, two conveyers are employed and certain of the links 11 of each conveyer are provided with grooved wheels 19, the studs 20 for which, project laterally from a link 11 through the space between the channeled guides. The rod or shank 21 of a work holder 22 is disposed vertically between two grooved wheels 19 on the superimposed conveyers and said rod or shank is provided with a stud or roller 23 which runs on a cam track 24, so that as the work holder is moved forward by the carrier chains, it will also be raised from one tank 25 and then deposited in the next tank, by the operation of the stud or roller on the shank of the work holder, running on the cam trackway.

Slight changes might be made in the details of construction of my invention without departing from the spirit thereof or limiting its scope, and hence I do not wish to limit myself to the precise details herein set forth.

Having fully described my invention what I claim as new and desire to secure by Letters-Patent, is:—

1. In a carrier, the combination of channeled guides, sprocket wheels, a chain passing over said sprocket wheel and through said channeled guides, and rollers carried by links of the chain between the ends of said links and adapted to run between the flanges of the respective channeled guides.

2. In a carrier, the combination with two channeled guides having their flanges projecting toward each other, and sprocket wheels, of chains passing over said sprocket wheels and through the channeled guides, and rollers carried by said chain and adapted to run between the opposing flanges of the respective channeled guides.

3. In a carrier, the combination of channeled guides, sprocket wheels, a chain passing over the sprocket wheels and through said channeled guides, rollers carried by the chain to run within said channeled guides and other rollers carried by the chain to run between the flanges of the channeled guides.

4. In a carrier the combination of two channeled guides having their flanges projecting towards each other, sprocket wheels, a chain passing over said sprocket wheels and through the channeled guides between the parallel flanges of the latter, and rollers mounted on respective ends of hinge pins of the chain and disposed to run between the parallel flanges of each channeled guide.

5. In a carrier, the combination of sprocket wheels, a carrier chain, two channeled guides having their flanges projecting towards each other and inclosing one set of links of the chain, and rollers carried by said chain to run within the respective channeled guides and mesh with the sprocket wheels.

In testimony whereof, I have signed this specification in the presence of two subscribing witnesses.

DAVID FELIX BRODERICK.

Witnesses:
R. S. FERGUSON,
GEO. F. DOWNING.